2,867,660

ALIPHATIC BISISOTHIURONIUM COMPOUNDS

Moses Wolf Goldberg, Upper Montclair, and Albert Israel Rachlin, Hackensack, N. J., assignors to Hoffmann-La Roche Inc., Nutley, N. J., a corporation of New Jersey No Drawing. Application July 24, 1957
Serial No. 673,756

6 Claims. (Cl. 260—553)

This invention relates to aliphatic bisisothiuronium compounds. More particularly, the invention relates to free bases represented by the following structural formula

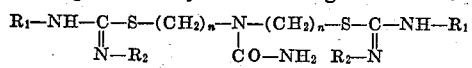

wherein $R_1$ and $R_2$ each represents hydrogen, lower alkyl or lower alkenyl, and $n$ represents 2 or 3, and to salts of said free bases.

The substituents on the terminal nitrogen atoms represented by $R_1$ and $R_2$ are straight chain or branched chain, saturated or unsaturated, lower aliphatic groups such as methyl, ethyl, propyl, isopropyl, butyl, isobutyl, tertiary butyl, allyl, butenyl, etc.

The compounds of this invention may be produced by reacting two mols of thiourea or an N-substituted thiourea with one mol of 1,1-bis($\beta$-haloethyl)urea or 1,1-bis($\gamma$-halopropyl)urea, preferably in a solvent such as methanol, ethanol, acetone, acetonitrile and mixtures of these solvents with water. The starting material for producing compounds wherein $n$ represents 2 in Formula I above, e. g. bis($\beta$-chloroethyl)urea, may be obtained by chlorinating diethanolamine with thionyl chloride. The bis-($\beta$-chloroethyl)amine hydrochloride thus obtained is treated with potassium cyanate in water to produce bis-($\beta$-chloroethyl)urea. The starting material for producing compounds wherein $n$ represents 3 in Formula I above, e. g. 1,1-bis($\gamma$-iodopropyl)urea, may be obtained in the following manner. $\beta,\beta'$-Iminodipropiononitrile is treated with ethanolic hydrogen chloride to obtain diethyl-$\beta,\beta'$-iminodipropionate hydrochloride. The imino group of the last named compound is benzoylated by the Schotten-Baumann reaction to obtain N,N-bis(2-carbethoxyethyl)benzamide which is reduced with lithium aluminum hydride to obtain benzylbis($\gamma$-hydroxypropyl)-amine. Benzylbis($\gamma$-hydroxypropyl)amine is debenzylated by hydrogenation with a palladium-carbon catalyst in the presence of hydrogen chloride to obtain bis-($\gamma$-hydroxypropyl)amine hydrochloride. The last named compound is suspended in chloroform and chlorinated with thionyl chloride to give bis($\gamma$-chloropropyl)amine hydrochloride, which is then treated with potassium cyanate in water to obtain 1,1-bis($\gamma$-chloropropyl)urea. 1,1-bis($\gamma$-chloropropyl)urea may be converted to 1,1-bis($\gamma$-iodopropyl)urea by treatment of the former with sodium iodide in a solvent such as acetone. Certain of the intermediates utilized in the production of the products of this invention are novel and are also within the scope of the invention.

The free bases having the structural Formula I above form acid addition salts such as the following by reaction with the appropriate organic or inorganic acid: hydrohalides, e. g. hydrochloride, hydrobromide, hydriodide, hydrofluoride, sulfate, nitrate, phosphate, acetate, oxalate, tartrate, malate, citrate, camphorsulfonate, picrate, benzenesulfonate, toluenesulfonate, salicylate, ascorbate, etc. Salts having one or more acid groups are within the scope of the invention. A preferred group of salts constitutes atoxic, therapeutically acceptable, acid addition salts, in particular, the hydrohalides. The products are frequently obtained, as a matter of convenience, in the form of the acid salt. The free base may be obtained from the acid salt by carefully neutralizing it in the cold with a base such as sodium hydroxide or ammonium hydroxide. The free base may in turn be converted to another acid salt by reaction with the appropriate acid.

The compounds of this invention are useful as therapeutic agents, particularly as anti-inflammatory agents, e. g. in the treatment of rheumatic disorders. They may be administered in therapeutic doses, orally or parenterally, by forming tablets, suspensions or solutions by incorporating therapeutic amounts in conventional vehicles and/or excipients, according to accepted pharmaceutical practice.

The novel compounds exist in tautomeric forms and these are also within the scope of the invention.

The following examples are illustrative of the invention. All temperatures are in degrees centigrade and all melting points are corrected.

*Example 1*

To a solution of 107 g. (0.6 mol) of crude bis($\beta$-chloroethyl)amine hydrochloride in 175 cc. of water in a 1-liter flask equipped with a stirrer and a thermometer was added a solution of 53.5 g. (0.66 mol) of potassium cyanate in 175 cc. of water. The temperature was kept below 30° by intermittent cooling with a cold water bath. After 30 minutes temperature control was unnecessary and the turbid solution was stirred at room temperature for 20 hours. The resulting clear solution was evaporated in vacuo at 100°. The residue was extracted with 750 cc. of hot ethanol, filtered by suction from the inorganic salts which were washed with hot ethanol. The combined filtrates were concentrated to 300 cc. by atmospheric distillation, and treated with activated charcoal, filtered and allowed to crystallize in a cool place, M. P. 150–151° with decomposition. Upon recrystallization from acetonitrile, the 1,1-bis($\beta$-chloroethyl)urea melted at 152–153°.

A solution of 38 g. (0.5 mol) of thiourea and 45.1 g. (0.244 mol) of 1,1-bis($\beta$-chloroethyl)urea in 400 cc. of ethanol was stirred and refluxed in a 1-liter flask for 2 hours. After 30 minutes a voluminous, white precipitate started to separate from the reaction mixture. The reaction mixture was cooled to room temperature and the solid was filtered, washed with two 200 cc. portions of ethanol followed by 200 cc. of acetone. The product, 2,2' - (N - carbamyliminodiethylene)bis(2 - thiopseudourea) dihydrochloride, was dried in vacuo at 50°, M. P. 184–186° with decomposition. Purification was effected by solution in a hot mixture of 117 cc. of water and 428 cc. of ethanol, filtration, and then, the addition of 290 cc. of acetone, M. P. 192–192.5° with decomposition. Upon recrystallization three times from water, ethanol and acetone, the compound melted at 193–194° with decomposition.

*Example 2*

Ethanolic hydrogen chloride (900 cc., 9.5 N) was charged into a 2-liter stirred flask equipped with an efficient reflux condenser, dropping funnel, thermometer and a cooling bath. The contents of the flask were cooled to 0°, and 123 g. (1.0 mol) of $\beta,\beta'$-iminodipropionitrile were added rapidly while the temperature was kept below 10°. A white crystalline precipitate separated. The temperature was raised to the boiling point. At about 60–70°, after about 90% of the precipitate had dissolved, ether was eliminated accompanied by vigorous refluxing and the formation of a very heavy precipitate. After the reaction had subsided, the temperature was raised to 78° and the reaction mixture was stirred and refluxed for 1 hour. After cooling to 5°, the solid (ammonium chloride) was filtered, washed with ethanol and the filtrate was evaporated in vacuo. The residual oil was dissolved in 250 cc. of ethanol, treated with activated charcoal and 1,000 cc. of ether was added to the filtrate. After refrigeration, the product, diethyl β,β'-iminodipropionate hydrochloride, was filtered, washed with ether and air dried. Upon recrystallization from a mixture of acetone and ether, the product melted at 78–79°.

A stirred mixture of 100 cc. of methylene chloride and a solution of 50.7 g. (0.2 mol) of diethyl β,β'-iminodipropionate hydrochloride in 150 cc. of water to which a trace of phenolphthalein had been added was cooled to 0°. One-half of a solution of 16 g. (0.4 mol) of sodium hydroxide in 100 cc. of water was added carefully, with cooling, so that the temperature was kept below 5°. The remaining sodium hydroxide solution and a solution of 28.1 g. (23.2 cc., 0.2 mol) of benzoyl chloride in 30 cc. of methylene chloride were added simultaneously at a rate such that the temperature was maintained from 0° to 5° and the reaction mixture was just faintly alkaline to phenolphthalein. After stirring at 0° for an additional 15 minutes, the layers were separated and the aqueous phase was extracted with two 50 cc. portions of methylene chloride. The bulked methylene chloride extracts were dried over sodium sulfate and evaporated in vacuo. The oily residue was distilled from a Claisen flask and, after a short forerun, the product, N,N-bis(2-carbethoxyethyl)benzamide, distilled as a colorless oil at 182–184°/0.04 mm.

Lithium aluminum hydride (19.1 g., 0.5 mol) and 500 cc. of absolute ether were stirred and refluxed in a 2-liter flask for 2 hours. The resulting suspension was cooled to room temperature and a solution of 54 g. (0.168 mol) of N,N-bis(2-carbethoxyethyl)-benzamide in 100 cc. of absolute ether was added over a period of 45 minutes. No effort was made to cool the exothermic reaction. The mixture was stirred and refluxed for 6 hours and then it was allowed to stand at room temperature for 12 hours. After cooling to 0°, 200 cc. of ethyl acetate were added dropwise, then 400 cc. of wet ether containing 40 cc. of ethanol and finally 200 g. of solid sodium chloride and 80 cc. of water in that order. After stirring for 30 minutes the solid matter was filtered through a sintered glass funnel, washed with ether and the filtrate was dried with sodium sulfate and evaporated in vacuo to obtain as a residual turbid oil, benzylbis(γ-hydroxypropyl)amine.

A solution of 37 g. (0.166 mol) of benzylbis(γ-hydroxypropyl)amine in 100 cc. of ethanol was added to a suspension of 7 g. of 10% palladium-carbon catalyst in 20 cc. of water. Alcoholic hydrogen chloride (35 cc., 9.5 N) was added and, after cooling to room temperature, the compound was hydrogenated in a Parr apparatus under an initial hydrogen pressure of 40 p. s. i. The theoretical amount of hydrogen was absorbed at room temperature after 12 hours. The catalyst was filtered, washed with alcohol and the filtrate, which had a strong odor of toluene, was evaporated in vacuo. The residual oil, crude bis(γ-hydroxypropyl)amine hydrochloride, could not be induced to crystallize and was used in the next step without purification.

A solution of 50 cc. (82 grams, 0.69 mol) of thionyl chloride in 50 cc. of chloroform was added from a dropping funnel to a suspension of 26.6 grams (0.157 mol) of oily bis(γ-hydroxypropyl)-amine hydrochloride in 75 cc. of chloroform. The time of addition was 10 minutes. The resulting clear solution was immediately refluxed for 15 minutes and, without delay, the solution was cooled with an ice bath. The crystals which separated were filtered, washed with chloroform and dried in vacuo at 50°, M. P. 210–213° with decomposition. The filtrate (including the washes) was evaporated in vacuo at 80° and the oily residue was crystallized from 70 cc. of ethanol. The two crops of the product, bis(γ-chloropropyl)amine hydrochloride, were combined and crystallized from 325 cc. of acetonitrile, M. P. 215–218° with decomposition. Careful neutralization of the hydrochloride with cold ammonium hydroxide and extraction with benzene gives bis(γ-chloropropyl)amine.

A solution of 5.5 g. (0.068 mol) of potassium cyanate in 30 cc. of water was added to a solution of 12 g. (0.058 mol) of bis(γ-chloropropyl)amine hydrochloride in 40 cc. of water. The temperature was kept at 20° for 30 minutes by intermittent cooling in a water bath and then the solution, which had become turbid after 10 minutes, was allowed to stand at room temperature for 18 hours. The reaction mixture was extracted with three 35 cc. portions of methylene chloride. The bulked extracts were dried over sodium sulfate and evaporated in vacuo. The residual oil, after being heated in vacuo at 100° for 1 hour, set to a hard crystalline mass. Recrystallized from a mixture of 40 cc. of methanol and 40 cc. of ether, the product, 1,1-bis(γ-chloropropyl)-urea melted at 158–160°. Re-working the mother liquor produced a second crop of crystals. Upon recrystallization three times from a mixture of methanol and ether, the product melted at 160–161°.

A solution of 5.35 g. (0.025 mol) of 1,1-bis(γ-chloropropyl)-urea and 7.75 g. (0.052 mol) of sodium iodide in 250 cc. of acetone was stirred and refluxed for 20 hours. The warm reaction mixture was filtered from the sodium chloride and the product, 1,1-bis(γ-iodopropyl) urea crystallized when the filtrate was concentrated and refrigerated. Upon recrystallization three times from acetonitrile, the product melted at 141–143°.

A solution of 2.4 g. (0.032 mol) of thiourea and 5.8 g. (0.015 mol) of 1,1-bis(γ-iodopropyl)urea in 150 cc. of acetone was stirred and refluxed for 18 hours. The product, 2,2' - (N - carbamyliminoditrimethylene)bis(2-thiopseudourea) dihydriodide, which had separated from the hot reaction mixture, was filtered, washed with acetone and dried, M. P. 147–149° with decomposition. The melting point of a sample was unchanged after being recrystallized three times from a mixture of ethanol and acetone.

*Example 3*

A solution of 7.4 g. (0.04 mol) of 1,1-bis(β-chloroethyl)urea and 10.2 g. (0.088 mol) of 1-allyl-2-thiourea in 100 cc. of ethanol was refluxed for 20 hours. The reaction mixture was cooled to room temperature and acetone (190 cc.) was added to the stirred solution until a slight turbidity persisted. The solution was seeded and the product, 2,2' - (N - carbamyliminodiethylene)bis(1-allyl - 2 - thiopseudourea) dihydrochloride, crystallized slowly, M. P. 146–148° with decomposition. The melting point of a sample did not change after being recrystallized three times from a mixture of alcohol and acetone.

*Example 4*

A solution of 3.7 g. (0.02 mol) of 1,1-bis(β-chloroethyl)urea and 5.8 g. (0.044 mol) of 1,3-diethyl-2-thiourea in 50 cc. of ethanol was refluxed for 20 hours. The solvent was distilled off in vacuo and the amorphous solid residue was crystallized from a mixture of 40 cc. of isopropanol, 20 cc. of acetonitrile and 60 cc. of acetone. The product, 2,2'-(N-carbamyliminodiethylene)bis(1,3-diethyl - 2 - thiopseudourea) dihydrochloride melted at 152–154° with decomposition. Upon recrystallization three times from a mixture of ethanol and acetone the product melted at 154–156° with decomposition.

*Example 5*

A solution of 3.7 g. (0.02 mol) of 1,1-bis(β-chloroethyl)-urea and 8.26 g. (0.044 mol) of 1,3-dibutyl-2-thiourea in 50 cc. of ethanol was refluxed for 20 hours. The cooled reaction mixture was diluted with 50 cc. of acetone and the oil which precipitated was induced to crystallize by trituration with several portions of acetone and ether. The product, 2,2'-(N-carbamyliminodiethylene)bis(1,3 - dibutyl - 2 - thiopseudourea) dihydrochloride melted at 133–135°. Upon recrystallization three times from a mixture of ethanol, acetone and ether, the product melted at 134–136°.

Example 6

A solution of 8.8 g. (0.0476 mol) of 1,1-bis(β-chloroethyl)-urea and 9.0 g. (0.1 mol) of 1-methyl-2-thiourea in 100 cc. of ethanol was refluxed for 20 hours. The product, 2,2'-(N - carbamyliminodiethylene)bis(1 - methyl - 2 - thiopseudourea) dihydrochloride, was obtained in two crops by diluting the reaction mixture with acetone and refrigerating, M. P. 138–140°. Upon recrystallization twice from a mixture of aqueous ethanol and acetone, the product melted at 145–148°.

Example 7

A solution of 8.8 g. (0.0476 mol) of 1,1-bis(β-chloroethyl)-urea and 10.4 g. (0.1 mol) of 1-ethyl-2-thiourea in 100 cc. of ethanol was refluxed for 20 hours. The cooled reaction mixture was diluted with 150 cc. of acetone and, after seeding, the product, 2,2'-(N-carbamyliminodiethylene)bis(1 - ethyl - 2 - thiopseudourea) dihydrochloride, crystallized slowly. The melting point was indefinite, being dependent on the rate of heating. A sample, recrystallized three times from a mixture of ethanol, acetonitrile and acetone, decomposed at 95°, the temperature at which the main batch of material decomposed.

We claim:

1. A free base of the group selected from those having the structural formula

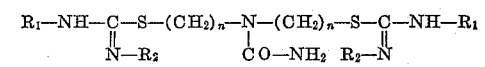

wherein $R_1$ and $R_2$ each represents a member of the group consisting of hydrogen, lower alkyl and lower alkenyl, and $n$ represents an integer from 2 to 3, and salts of said free bases.

2.

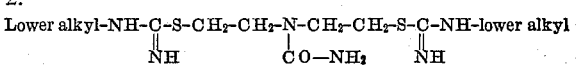

3.

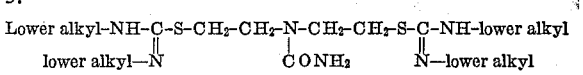

4. 2,2' - (N - carbamyliminodiethylene)bis(2 - thiopseudourea).

5. 2,2' - (N - carbamyliminoditrimethylene)bis(2-thiopseudourea).

6. 2,2' - (N - carbamyliminodiethylene)bis(1,3 - dibutyl-2-thiopseudourea).

References Cited in the file of this patent

Chemical Abstracts, vol. 43, column 2927 (1949).
Burchenal et al.: Cancer, vol. 4, pages 353–356, March 1951.